UNITED STATES PATENT OFFICE.

DUANE HULL, OF NEWBURG, NEW YORK.

IMPROVEMENT IN EXTRACTING TURPENTINE AND OTHER PRODUCTS FROM RESINOUS WOODS.

Specification forming part of Letters Patent No. 48,406, dated June 27, 1865.

*To all whom it may concern:*

Be it known that I, DUANE HULL, of Newburg, in the county of Orange and State of New York, have made a new and useful Improvement in Extracting Spirits of Turpentine and other Products from Pine Wood and other Resinous Woods; and I hereby declare that the following is a full and exact description of the same.

This invention consists in effecting the distillation of the wood under a pressure less than that of the ordinary atmospheric pressure; and I accomplish this by means of an air-pump, or other suitable device, applied so as to exhaust or draw off the air and vapors from the wood during the process of distillation.

In a patent issued to me bearing date September 20, 1864, I have described a process for obtaining spirits of turpentine and other products from pine wood. One of the difficulties attending the application of that process in practice is to keep the temperature from rising at times so as to destroy the turpentine and other products existing in the wood.

Referring to the specification of my patent above mentioned for the general principles involved in obtaining useful products from resinous woods, the following description will enable persons skilled in the art to apply this my invention.

The wood should be prepared in the manner well known to those skilled in distilling pine wood to obtain turpentine, rosin, &c., and introduced into any suitable retort or still, such as is commonly used for distilling wood, coal, &c. Heat should then be applied by any suitable heating device, so as to raise the temperature to the point of distillation. Before the temperature reaches this point an air-pump or other suitable device for drawing off the vapors from the still or retort should be put in operation so as to draw off the air and vapors from the inside of the still or retort, and thus keep the pressure inside below that of the atmospheric pressure. The effect of relieving the pressure in this manner is to cause the vapors of turpentine and other vaporizable products to leave the wood at a lower temperature than they would if the pressure were not removed. Destructive distillation is thereby prevented and a larger yield of valuable products is obtained from the wood.

The necessary heat to effect distillation may be applied either by means of any suitable furnace under the retort or still, or steam or hot-air may be used as the medium of heat, either passed directly into the retort or still, or applied in a jacket or space around the retort or still.

I prefer using superheated steam. This I let into the retort or still in just sufficient quantity to keep the temperature within up to the vaporizing-point of the product to be drawn off. It is best to have the still incased in some good non-conducting material, so as to prevent any loss of heat. The vapors as drawn off from the still are caused to pass through any suitable condenser in which they will be condensed and collected in the bottom of the condenser, while the uncondensable gases will pass off either into the open atmosphere or into a suitable apparatus for burning them. The condensed products may be drawn off as often as deemed desirable.

Instead of using steam in the still water may be placed in the still with the wood and then vaporized by the application of heat.

I do not claim the use of steam for distilling wood; nor do I claim, broadly, distilling with exhaustion or under reduced pressure; but, Having described my invention and the several modes in which I propose to carry it into effect, what I claim, and desire to secure by Letters Patent of the United States, is—

The distillation of pine or other resinous wood for the purpose of obtaining spirits of turpentine or other products, under reduced pressure, or pressure less than that of the atmosphere, substantially as herein set forth and described.

DUANE HULL.

Witnesses:
JOHN S. HOLLINGSHEAD,
F. B. CULVER.